Figure 1:
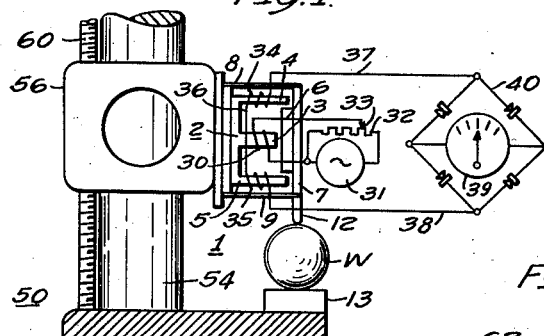

Dec. 19, 1944.   H. T. RIGHTS ET AL   2,365,593
ELECTRIC GAUGE
Filed Nov. 19, 1942

WITNESSES:
E. A. McCloskey
Wm. C. Groome

INVENTORS
Herbert T. Rights, Henry L. Bernarde
and Frederick J. Altman.
BY
C. L. Friedman
ATTORNEY Patented Dec. 19, 1944

2,365,593

UNITED STATES PATENT OFFICE 2,365,593

ELECTRIC GAUGE

Herbert T. Rights, Verona, and Henry L. Bernarde, Union, N. J., and Frederick J. Altman, Drew Field, Fla., assignors to Westinghouse Electric & Manufacturing Company, East Pittsburgh, Pa., a corporation of Pennsylvania Application November 19, 1942, Serial No. 466,142

3 Claims. (Cl. 33—147)

This invention relates to devices for measuring mechanical displacements and dimensions and it has particular relation to electrical devices having an electrical output dependent on a mechanical displacement or dimension to be measured.

Because of their sensitivity and flexibility, electrical measuring instruments have been employed for the purpose of measuring mechanical displacements and dimensions. Since such devices must operate with extreme accuracy, it is desirable that they have a minimum of parts subject to mechanical and electrical variations.

In accordance with the invention, an electrical measuring device for measuring mechanical displacements and dimensions is provided with a magnetic circuit having only two relatively movable parts. These parts may include an E-shaped magnetic member having a pair of outer legs and an inner leg. An armature member is disposed for movement between the outer legs in accordance with a dimension or displacement to be measured. Such a magnetic structure provides two magnetic circuits, each including one of the outer legs of the magnetic member. The inner leg is common to both of the circuits.

For energizing the magnetic structure, a winding which may be termed a primary winding, is disposed on the inner leg and is energized from a source of voltage. A separate winding, which may be termed a secondary winding, is disposed on each of the outer legs and has induced therein a voltage which is dependent on the value of the magnetic flux passing through the associated outer leg. Suitable translating means such as an electrical measuring instrument is provided for measuring the difference in induced voltages of the secondary windings. Such difference is controlled by the displacement of the armature member relative to the associated E-shaped magnetic member.

It is, therefore, an object of the invention to provide an improved electrical measuring device for measuring mechanical displacements and dimensions.

It is a further object of the invention to provide an electrical measuring device responsive to mechanical displacements and dimensions wherein a magnetic structure is required having only two relatively movable parts.

It is a still further object of the invention to provide an electrical measuring device responsive to mechanical displacements and dimensions wherein a magnetic structure is provided having two magnetic paths and having a magnetic portion common to the two magnetic paths.

It is an additional object of the invention to provide an electrical measuring device for determining mechanical dimensions wherein a magnetic structure is provided for directing magnetic flux from a primary winding through two secondary windings, the division of magnetic flux between the secondary windings being dependent on the value of the dimension to be measured.

Figure 2:
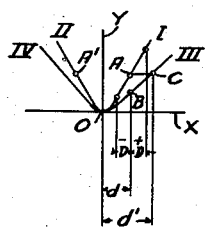
Figure 3:
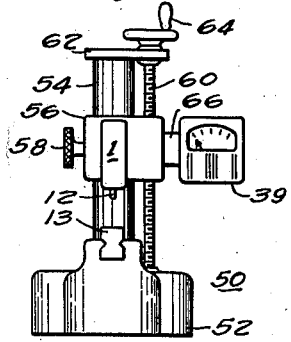
Figure 5:
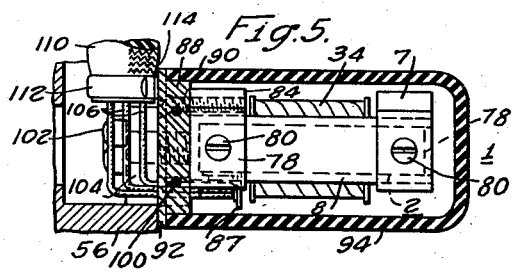
Figure 4:
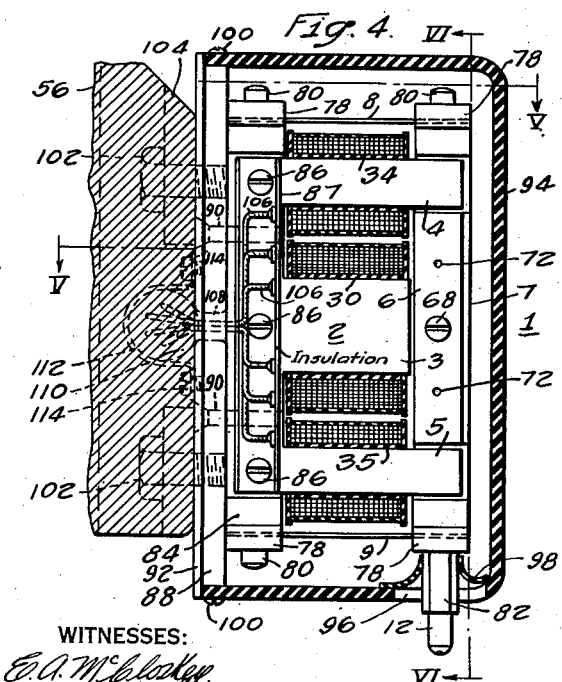
Figure 6:
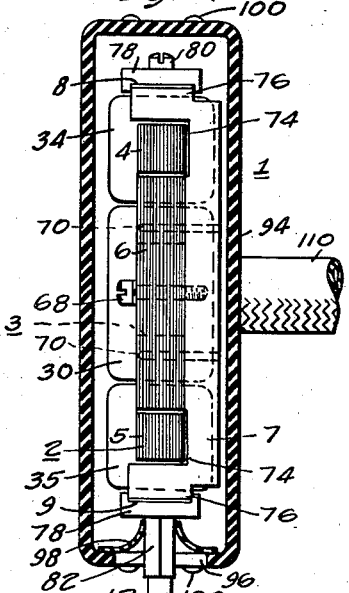

Other objects of the invention will be apparent from the following description taken in conjunction with the accompanying drawing, in which:

Figure 1 is a schematic view with parts shown in elevation and parts broken away of a measuring device embodying the invention, Fig. 2 is a graphical view showing the operating characteristics of the measuring device of Fig. 1, Fig. 3 is a view in front elevation of a complete measuring device embodying the invention, Fig. 4 is a view in side elevation with parts in cross section of a gauge head suitable for the device of Figs. 1 and 2, Fig. 5 is a view in cross section taken along the line V—V of Fig. 4, and Fig. 6 is a view in cross section taken along the line VI—VI of Fig. 4.

Referring to the drawing, Figure 1 shows an electrical gauge device which includes a gauge head 1. This gauge head is provided with an E-shaped magnetic core 2 having a centrally disposed leg 3 and outer magnetic legs 4 and 5. A magnetic armature 6 is positioned adjacent the centrally disposed leg 3 for movement between the outer legs 4 and 5 of the magnetic core 2. By inspection of Fig. 1, it will be observed that movement of the magnetic armature 6 serves to vary simultaneously in reverse directions air gaps between the magnetic armature 6 and each of the legs 4 and 5. Consequently, movement of the armature serves to vary the reluctances of two magnetic paths, one of which includes the outer leg 4, and the second of which includes the outer leg 5 of the magnetic core. Both of these magnetic paths include as a common portion the centrally disposed leg 3 of the magnetic core. The core 2 and the armature 6 are formed of magnetic material preferably having high electrical resistivity, such as silicon steel or a material similar to that disclosed in United States Patent No. 1,807,021 and marketed under the trade-name "Hipernik." The magnetic material may be laminated or it may be employed in solid section form.

The magnetic armature 6 is mounted on a supporting member 7 which conveniently may be formed of a non-magnetic material, such as brass. Movement of the magnetic armature is confined to a path determined by two leaf springs 8 and 9 which also may be formed of brass or any suitable material. One end of each of the springs 8 and 9 is rigidly attached to the supporting member 7 in any suitable manner. The remaining ends of the springs are attached to the magnetic core 2.

Flexure of the springs 8 and 9 permits movement of the magnetic armature 6 to vary the air gaps between the magnetic armature and the legs 4 and 5. Such movement may be determined by a gauge pin 12 which is attached to the supporting member 7. The gauge pin 12 may be positioned above a fixed table or platen 13. Work to be measured may be positioned on the platen 13 beneath the pin 12. The position of the magnetic armature 6 with respect to the magnetic core 2 is then determined by the dimensions of the work to be measured.

Since movements of the magnetic armature 6 modify the reluctances of the magnetic paths including, respectively, the legs 4 and 5, the resulting change in the reluctances may be employed to indicate the degree of movement of the magnetic armature. For this purpose the centrally disposed leg 3 is surrounded by a winding 30 which is energized from a source of alternating current 31. Preferably the source of alternating current 31 is a constant voltage source. To permit variation of the voltage applied to the winding 30, a potentiometer 32 may be interposed between the source 31 and the winding 30. By operation of a movable tap 33, the voltage applied to the winding 30 may be varied, if desired.

Alternating current flowing through the winding 30 produces an alternating magnetic flux in the leg 3. When the magnetic armature 6 is mid-way between the legs 4 and 5, the alternating magnetic flux divides equally between the legs 4 and 5. Movement of the magnetic armature 6 from this mid-position increases the reluctance of one of the magnetic paths and decreases that of the remaining magnetic path. These changes in reluctance are accompanied by a corresponding change in the magnetic fluxes in the legs 4 and 5. Therefore, the changes in magnetic fluxes in the legs 4 and 5 correspond to the displacement of the movable armature 6.

For measuring the variations in magnetic fluxes passing through the legs 4 and 5, windings 34 and 35 are positioned, respectively, about the legs. Each of the windings 34 or 35 will have an alternating voltage induced therein which is dependent upon the magnitude of magnetic flux passing through the associated leg of the magnetic core 2. The windings 34 and 35 are connected in opposition in a series circuit by means of conductors 36, 37, and 38. Consequently, when the voltage induced in the windings 34 and 35 are equal, no current flows in the series circuit. If the windings 34 and 35 have equal numbers of turns, equal voltages will be induced therein when the magnetic armature 6 is positioned mid-way between the legs 4 and 5 of the magnetic core 2. When the magnetic armature 6 is displaced from this mid-position, the voltages induced in the windings 34 and 35 are not equal, and the resulting difference in voltages produces a current in the series circuit. This current may be measured by a suitable measuring instrument connected between the conductors 37 and 38.

In the specific embodiment illustrated in Fig. 1, the measuring instrument may take the form of a conventional permanent-magnet, moving-coil instrument 39 which is sometimes referred to as a D'Arsonval instrument, and which has excellent sensitivity. Since the instrument 39 is a direct-current instrument, a suitable rectifier 40 is connected between the instrument 39 and the conductors 37 and 38 to convert the alternating current flowing in the conductors 37 and 38 into direct current for energizing the instrument. Although any suitable rectifier may be employed, the rectifier 40 conveniently may be a barrier-layer rectifier such as a copper-oxide rectifier. Such copper-oxide rectifiers may be connected in the familiar bridge form illustrated in Fig. 1 for providing full-wave rectification of the alternating current. If desired the rectifier may have a filter associated therewith for smoothing the rectified current supplied to the measuring instrument. Ordinarily such a filter is not required.

The operation of the gauge device illustrated in Fig. 1 may be understood more fully by reference to the graphic representation of Fig. 2. In Fig. 2 the voltage applied to the measuring instrument 39 is plotted as ordinates against the displacement of the magnetic armature 6 as abscissae. In Fig. 2, the reference axes Y and X intersect at a point 0 which corresponds to that position of the magnetic armature 6 mid-way between the legs 4 and 5. The characteristic of the gauge device illustrated in Fig. 1 is represented in Fig. 2 by the full line curve I—II.

By inspection of the curve I—II, it will be observed that for a displacement of the magnetic armature 6 in one direction from its mid-point, which will be assumed to be an upward direction, as viewed in Fig. 1, for a distance $d$, the voltage applied to the measuring instrument has a value corresponding to the point A in Fig. 2. However, it will be noted that the curve I—II is substantially symmetrical about the Y axis. For this reason, a displacement of the magnetic armature 6 in a downward direction (as viewed in Fig. 1) for a distance $-d$ results in the application of a voltage corresponding to the point A' to the measuring instrument 39 which is equal to the voltage corresponding to the point A. Consequently, inspection of the measuring instrument 39 would not indicate which of the distances, $d$ or $-d$, is responsible for the measuring instrument indication.

To avoid such ambiguities, movement of the magnetic armature 6 may be restricted to one side only of its mid-point position. For the purpose of discussion, it will be assumed that movement of the armature 6 from its mid-point position is permitted only in an upward direction. For such an adjustment, only that portion of the curve I—II which lies on the right of the axis Y is employed.

By inspection of Fig. 2, it will be observed further that the curve I—II departs from linearity adjacent the axis Y. This departure from linearity is caused principally by the variation of the resistance of the rectifier with respect to current. For these reasons, the magnetic armature 6 is permitted to move only in the range assuring a linear voltage output.

In operation a reference block having a standard dimension is positioned upon the platen 13. The gauge head 1 then is moved relative to the table 13 until with the pin 12 in engagement with the reference block, the indicating pointer of the measuring instrument 39 is at a predetermined point on the scale, such as the zero point. It will be assumed that the voltage necessary to move the pointer to the zero position corresponds to the voltage represented by the point A in Fig. 2.

With the zero position of the gauge head determined, the gauge head is adjusted to provide an adequate range of movement. This range of movement is represented in Fig. 2 by the distances $-D$ and $+D$. In other words, the point A serves as a reference point for operation of the gauge device. Voltage outputs above that represented by the point A indicate that work positioned beneath the pin 12 is oversize. Conversely, a voltage output having a value less than that represented by the point A indicates that work positioned beneath the pin 12 is smaller than standard.

It sometimes is desirable to change the sensitivity of the gauge device from that represented by the curve I—II in Fig. 2 to that represented by a new curve, such as the curve III—IV of Fig. 2. Such a change in sensitivity may be effected, for example, by decreasing the voltage applied to the winding 30. This decrease is obtained by proper adjustment of the movable tap 33 with respect to the potentiometer 32. When such a change in sensitivity is effected, it becomes necessary to readjust the gauge head. The necessity for the adjustment may be understood from a brief discussion of Fig. 2.

When the sensitivity corresponds to the curve III—IV a deflection of the magnetic armature having a value $d$ produces a voltage equal to that represented by the point B on the curve III—IV. This voltage is not sufficient to actuate the pointer of the measuring instrument 39 to the zero point on its scale. Consequently, the gauge head must be adjusted to provide a deflection $d'$ which produces a voltage corresponding to the point C on the curve III—IV. Since this voltage is equal to that represented by the point A, the pointer of the measuring instrument 39 indicates the correct value. At the same time, the gauge must be adjusted to provide a suitable range of movement of the magnetic armature on either side of the new "center" position represented by the point B. These adjustments are discussed in the copending H. T. Rights et al. application, Serial No. 421,850, filed December 5, 1941 and assigned to the same assignee.

As shown in Figs. 1 and 3, the gauge head 1 may be associated with any suitable standard 50. In the specific embodiment of Figs. 1 and 3, the standard includes a base 52 designed to receive detachably the work table 13. In addition, the base 52 supports a vertical pillar 54 which serves as a guide for a slidable carriage 56. This carriage has an opening for snugly receiving the pillar 54. A clamping screw 58 is provided for clamping the carriage at any position on the pillar 54 to which the carriage is adjusted.

For adjusting the carriage 56, an adjusting screw 60 is rotatably mounted in the base 52 and a bracket 62 carried by the pillar 54. The bracket 62 and the base 52 permit rotation of the screw 60 but prevent axial movement thereof. Rotation of the screw 60 may be effected by a suitable handle 64 provided at one end thereof. The carriage has a threaded opening for threadedly engaging the screw 60.

By rotation of the handle 64, the carriage 56 may be raised or lowered with respect to the table 13 to any desired position. When the carriage arrives at the desired position, the clamping screw 58 may be manipulated to clamp the carriage 56 firmly to the pillar 54. Standards of this general type are well known in the art.

The gauge head 1 may be secured in any desirable manner to the carriage 56. Consequently, movement of the carriage may be utilized for adjusting the gauge pin 12 with respect to the table 13. In addition, the carriage 56 may have the instrument 39 secured thereto by means of a suitable bracket 66.

A suitable design for the gauge head 1 is shown in greater detail in Figs. 4, 5 and 6. As previously pointed out, the E-shaped magnetic core 2 and the magnetic armature 6 may be constructed of any suitable soft magnetic material. In the specific embodiment of Figs. 4, 5 and 6, these parts are assumed to be formed of laminations. Such laminations tend to reduce the flow of eddy currents in the core and armature during operation of the gauge.

The magnetic armature 6 is attached to its supporting member 7 in any suitable manner as by means of a machine screw 68, which passes through an opening in the armature and is received in a threaded opening provided in the supporting member 7. In addition, the supporting member 7 may be provided with locating pins 70 which are received snugly in openings 72 formed in the magnetic armature 6. By this construction, the magnetic armature 6 may be removed simply by releasing the machine screw 68 and may be replaced as desired by other armatures.

By inspection of Fig. 6, it will be observed that the supporting member 7 is provided with pockets 74 for adequately spacing the supporting member from the legs 4 and 5 of the magnetic core. The supporting member 7 may be attached in any desired manner to the springs 8 and 9. In the specific embodiment illustrated in the drawing, the supporting member 7 is provided with platforms 76 for engaging the springs 8 and 9 with U-shaped clamping members 78 for clamping the springs to the supporting member. A screw 80 may be provided for securing the upper clamping member 78 to the supporting member 7. To facilitate attachment of the gauge pin 12 to the gauge head, a machine screw 82 may be provided for the lower clamping member 78 having an elongated head to which the gauge pin 12 may be secured in any desired manner, as by providing the gauge pin and associated screw with mating male and female threads.

The magnetic core 2 may be secured to a supporting member 84 which is similar in construction to the supporting member 7. However, the supporting member 84 need not be provided with pockets similar to the pockets 74 for providing a space between the legs 4 and 5 and the supporting member. The magnetic core 2 may be secured to the supporting member 84 by means of suitable machine screws 86. These screws also are employed for securing to the magnetic core an insulating angle 86 which serves as a terminal panel for the leads of the windings 30, 34 and 35. The supporting member 84 also is provided with the clamping members 78 and machine screws 80 for securing the remaining ends of the springs 8 and 9 thereto.

The supporting member 84, is, in turn, secured to a plate 88 by means of machine screws 90. The plate 88 may have a flange 92 about its periphery for cooperation with a cover 94 for the gauge head. This cover has an opening 96 permitting passage of the gauge pin 12 therethrough. To exclude dust from the interior of the cover, a flexible membrane 98, such as one formed of rubber, may be employed for closing the opening 96 without interference with the free motion of the gauge pin 12. The cover 94 is secured to the plate 88 by means of suitable machine screws 100.

For securing the gauge head 1 to the carriage 56, machine screws 102 may pass through openings in flange 104 formed on the carriage 56 into threaded openings provided in the plate 88. Conductors 106 may extend from the terminal panel 87 through an opening 108 in the plate 88 and through a conduit 110 for connecting the windings to the instrument 39 and the generator 31. The conduit may be attached to the gauge head by means of a clamp 112 which is attached to the plate 88 by means of screws 114. It will be understood that the conductors 106 are connected to the leads from the windings 30, 34 and 35 at the terminal panel 87.

From the foregoing discussion, it is believed that the operation of the gauge as a whole is apparent. With the parts in the positions illustrated in Fig. 3, a reference block of correct dimension is positioned on the table 13 beneath the gauge pin 12. The screw 60 then is rotated to force the gauge pin 12 against the reference block until the instrument 39 gives a desired reading which conveniently may be a mid-scale reading. The clamping screw 58 then is operated to clamp the carriage firmly in its adjusted position. It will be understood that the instrument 39 may be a conventional measuring instrument wherein the pointer occupies a left-hand position when deenergized, as illustrated in Fig. 3. When the gauge pin 12 is adjusted for a reference block 12, a voltage is applied to the instrument 39 which corresponds to the value represented by the point A in Fig. 2. This voltage may be sufficient to drive the pointer of the instrument to its mid-scale position, thereafter positions of the pointer below mid-scale indicate that the overwork being measured is undersized. Conversely, positions above its mid-scale position indicate that the overwork being measured is oversized. In Fig. 1, the work W on the table 13 is assumed to have the correct dimension. For this reason, the pointer of the instrument 39 occupies its mid-scale position.

When work is placed on the table 13, the work engages the pin 12 and actuates the pin in an upward direction. Although gravity alone may suffice to bias the armature 6 and its supporting member 7 downwardly into engagement with the work, if desirable an additional bias may be exerted by the springs 8 and 9 for this purpose. Movement of the armature in accordance with the dimension of the work being measured varies the reluctances of the two magnetic paths including respectively the legs 4 and 5. The variations in reluctances of the magnetic paths are accompanied by variations in the magnetic flux traversing the legs 4 and 5 and in the voltages induced in the windings 34 and 35. The difference between voltages induced in the windings 34 and 35 is measured by the measuring instrument 39. If desired, the measuring instrument 39 may be calibrated directly in units of the dimension being measured.

Although the invention has been described with reference to certain specific embodiments thereof numerous modifications are possible. Therefore, the invention is to be restricted only by the accompanying claims as interpreted in view of the prior art.

We claim as our invention:

1. In an electrical measuring device responsive to mechanical displacements, an E-shaped magnetic member including a pair of spaced outer legs and an inner leg, an armature member of magnetic material extending between said outer legs, said inner leg being shorter than said outer legs to provide a face adjacent said armature member, said armature member being spaced from said outer legs to provide air gaps therebetween, means mounting said armature member for movement substantially parallel to said face of said inner leg to vary oppositely the air gaps between said armature member and said outer legs, said last-named means comprising a pair of leaf springs connecting said armature member to said magnetic member, a winding on said inner leg for producing, when energized, magnetic fluxes in said outer legs, and a separate winding on each of said outer legs, each of said windings having a voltage induced therein which is dependent on the magnetic flux passing through the associated leg of said magnetic member, said armature member having a contact element associated therewith, whereby displacements of said contact element relative to said magnetic member simultaneously vary oppositely the magnetic reluctances offered to magnetic fluxes passing respectively through said outer legs.

2. In an electrical measuring device responsive to mechanical displacements, a magnetic member, a magnetic armature element, means mounting said armature element for rectilinear motion with respect to said magnetic member in a predetermined direction, said armature element having first and second spaced surfaces disposed angularly with respect to said predetermined direction, and said armature element having a third surface extending substantially parallel to said predetermined direction, said magnetic member having surfaces respectively extending adjacent and substantially parallel to said first, second and third surfaces to define with said armature element a pair of magnetic paths having reluctances which vary oppositely in response to said rectilinear motion of said armature element, a separate electrical winding linked with each of said magnetic paths, and a winding effective, when energized, for producing magnetic flux in both of said paths, said last-named winding linking both of said magnetic paths.

3. In an electrical measuring device responsive to mechanical displacements, a magnetic member, a magnetic armature element, means mounting said armature element for rectilinear motion with respect to said magnetic member in a predetermined direction, said armature element having first and second spaced surfaces disposed angularly with respect to said predetermined direction, and said armature element having a third surface extending substantially parallel to said predetermined direction, said magnetic member comprising a magnetic base portion and first, second and third magnetic legs projecting from said base portion, said magnetic legs having surfaces respectively extending adjacent and substantially parallel to said first, second and third surfaces to define with said armature element a pair of magnetic paths having reluctances which vary oppositely in response to said rectilinear motion of said armature element, a separate electrical winding linked with each of said magnetic paths, and a third electrical winding surrounding said third magnetic leg for producing, when energized, magnetic flux in both of said magnetic paths.

HERBERT T. RIGHTS.
HENRY L. BERNARDE.
FREDERICK J. ALTMAN.